(12) United States Patent
Cadoret et al.

(10) Patent No.: US 8,967,938 B2
(45) Date of Patent: Mar. 3, 2015

(54) TRANSPORT TRAY

(75) Inventors: Bernard Cadoret, Mauron (FR); Jean-Luc Dreano, Mauron (FR)

(73) Assignee: Armor Inox, Mauron (FR)

( * ) Notice: Subject to any disclaimer, the term of this patent is extended or adjusted under 35 U.S.C. 154(b) by 399 days.

(21) Appl. No.: 13/239,844

(22) Filed: Sep. 22, 2011

(65) Prior Publication Data

US 2012/0087767 A1    Apr. 12, 2012

(30) Foreign Application Priority Data

Oct. 6, 2010   (FR) ...................................... 10 58108
Oct. 26, 2010  (FR) ...................................... 10 58772

(51) Int. Cl.
*B65G 65/00*    (2006.01)
*B65G 47/38*    (2006.01)

(52) U.S. Cl.
CPC ................ *B65G 65/00* (2013.01); *B65G 47/38* (2013.01); *B65G 2201/0258* (2013.01); *B65G 2207/46* (2013.01)
USPC ............................................. 414/403; 49/104

(58) Field of Classification Search
USPC ............. 414/402, 403; 211/85.4; 198/370.04, 198/370.05; 49/116, 104, 33, 73.1, 109, 49/112, 118; 16/55; 105/280, 286, 288, 105/284, 426, 429, 432
See application file for complete search history.

(56) References Cited

U.S. PATENT DOCUMENTS

| | | | | |
|---|---|---|---|---|
| 2,513,569 A | * | 7/1950 | Kuehlthau | 266/236 |
| 2,991,730 A | * | 7/1961 | Arbel | 105/240 |
| 3,192,876 A | * | 7/1965 | Ortner | 105/284 |
| 3,330,056 A | * | 7/1967 | Woodside et al. | 37/184 |
| 3,491,024 A | * | 1/1970 | Dannels et al. | 508/441 |
| 4,740,130 A | * | 4/1988 | Prins | 414/378 |
| 5,346,052 A | * | 9/1994 | Fox | 198/350 |
| 6,382,947 B1 | * | 5/2002 | Bryant | 425/130 |
| 6,762,382 B1 | | 7/2004 | Danelski | |
| 6,863,324 B1 | * | 3/2005 | Nakajima | 294/68.24 |
| 7,278,669 B2 | * | 10/2007 | Nakajima | 294/68.24 |
| 2009/0084836 A1 | * | 4/2009 | Dudley | 232/34 |
| 2010/0257772 A1 | * | 10/2010 | Uhlik | 43/61 |

* cited by examiner

FOREIGN PATENT DOCUMENTS

EP    0391575    10/1990

OTHER PUBLICATIONS

France Search Report for 10/58772 dated May 31, 2011 (non-English).
Written Opinion for 10/58772 dated Oct. 26, 2010 (non-English).

*Primary Examiner* — Saul Rodriguez
*Assistant Examiner* — Glenn Myers
(74) *Attorney, Agent, or Firm* — Nixon & Vanderhye, PC

(57) ABSTRACT

A transport tray for use in an installation for manufacturing food products, the installation having actuators. The transport tray has a chassis and a bottom having two panels mounted on the chassis, each having a first parallel edge and being able to move in rotation about a rotation axis parallel to the first edges between a transport position in which the distance between the first edges is less than the diameter of the fruit products and an unloading position in which at least one of the first edges is lowered so that the distance between the first edges is greater than the diameter of the food products. Each panel cooperates with an actuator for passing it from the transport position to the unloading position. Apparatus is provided to prevent lifting of the first edge of each panel beyond the transport position.

5 Claims, 6 Drawing Sheets

TRANSPORT TRAY

This application claims priority to FR 10/58108 filed 6 Oct. 2010 and FR 10/58772 filed 26 Oct. 2010, the entire contents of each of which are hereby incorporated by reference.

The present invention concerns a transport tray for food products, and an installation for manufacturing food products comprising such a transport tray.

In an installation of the ham production installation type, the products undergo various operations such as for example shaping, cooking, cutting, etc. Between these various operations, the products are transported by means of transport trays, each taking the form of a receptacle with a bottom on which the products are placed and edges that run around the bottom in order to prevent the products from falling.

The trays are generally stacked on one another, and the discharge of the food products is effected manually by an operator.

As these products are generally heavy, the work of the operator is tiring.

One object of the present invention is to propose a transport tray that does not have the drawbacks of the prior art and in particular facilitates the unloading work.

To this end, a transport tray is proposed intended to be used in a food product manufacturing installation, said manufacturing installation comprising actuators, the transport tray being characterised in that it comprises:
  a chassis,
  a bottom around which said chassis extends, said bottom consisting of two panels mounted on the chassis, each having a first edge parallel to and facing the first edge of the other panel, each panel being able to move in rotation about a rotation axis parallel to said first edges between a transport position in which the distance between the first edges is less than the diameter of the food products and an unloading position in which at least one of the first edges is lowered so that the distance between the first edges is greater than the diameter of the food products, each panel being intended to cooperate with an actuator intended to pass it from the transport position to the unloading position, and
  limitation means intended to prevent lifting of the first edge of each panel beyond the transport position.

Advantageously, the centre of gravity of each panel is disposed on the other side of said rotation axis with respect to the first edge of said panel, and Advantageously, the limitation means consist of a stop that each panel has and, for each stop, a support that the chassis has and on which said stop comes into abutment in the transport position.

Advantageously, for each panel, the stop is disposed along a second edge of said panel, which extends parallel to the first edge.

The invention also proposes a food product manufacturing installation characterised in that it comprises:
  a drive system,
  a discharge means,
  at least one transport tray according to one of the above variants, the chassis of which is moved by said drive system, and
  for each panel, at least one actuator intended to pivot said panel from its transport position to its unloading position above the discharge means.

Advantageously, the discharge means consists of a conveyor, of the belt conveyor type.

The features of the invention mentioned above, as well others, will emerge more clearly from a reading of the following description of an example embodiment, said description being given in relation to the accompanying drawings, among which:

FIG. 1 shows a partial view of a food product manufacturing installation according to the invention, FIG. 2 is a view, in the direction of the arrow II in FIG. 1, of a transport tray according to the invention in an unloading position, FIG. 3 shows a transport tray in the transport position, FIG. 4 shows the transport tray in a first unloading position, FIG. 5 shows the transport tray in a second unloading position, and FIG. 6 is a cross section of the transport tray of FIG. 4 along the plane VI.

In the following description, the terms relating to a position are taken with reference to a transport tray that transports food products as shown in FIG. 1.

FIG. 1 shows a manufacturing installation 50 that comprises a drive system 56 and a discharge means 54, which is here of the belt conveyor type.

The manufacturing installation 50 also comprises at least one transport tray 100 moved by the drive system 56.

In the embodiment of the invention presented here, the drive system 56 has a chassis having two struts 52, and two endless chains 58, each resting on a strut 52 and being driven in translation by a drive motor.

The transport 100 is placed on the two chains 58 and is driven in translation by the latter.

The transport tray 100 is loaded with food products 10.

In the embodiment of the invention presented here, each food product is for example cylindrically shaped ham slabs and the axis 12 is parallel to the struts 52.

The manufacturing installation 50 comprises an upstream work station disposed upstream of the struts 52 and a downstream work station disposed downstream of the discharge means 54.

The transport tray 100 is designed for unloading the food products 10 coming from the upstream station onto the discharge means 54 so that they are transported as far as the downstream station.

FIG. 2 shows the transport tray 100, which has a frame 104 that rests on the chains 58 and is moved by them.

In FIG. 2, the transport tray 100 is in an unloading position and the food products 10 are transferred from the transport tray 100 to the discharge means 54. The struts 52 are positioned above the discharge means 54 at a height enabling the food products 10 to pass under the struts 52.

Figure 1:
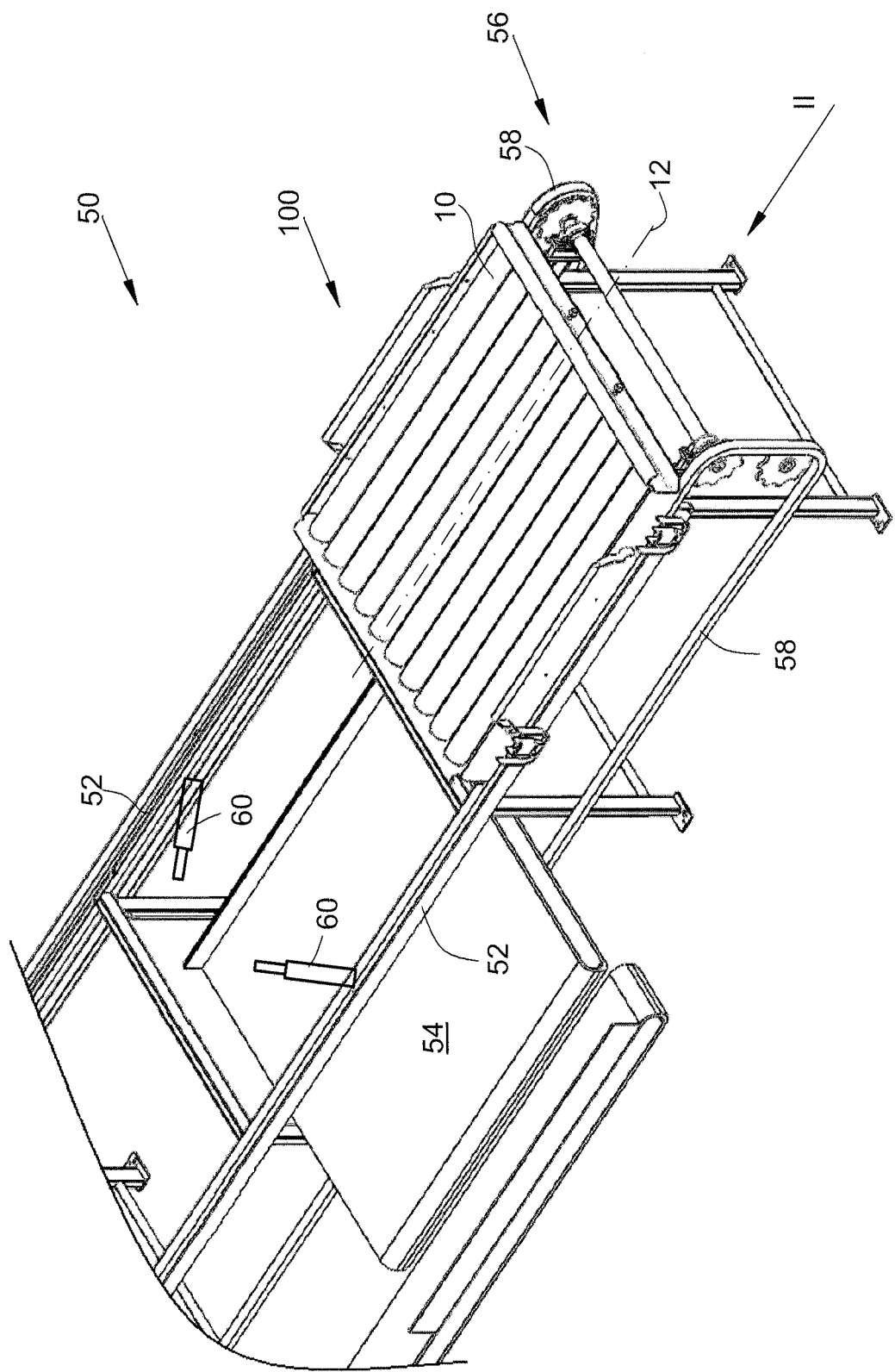
Figure 2:
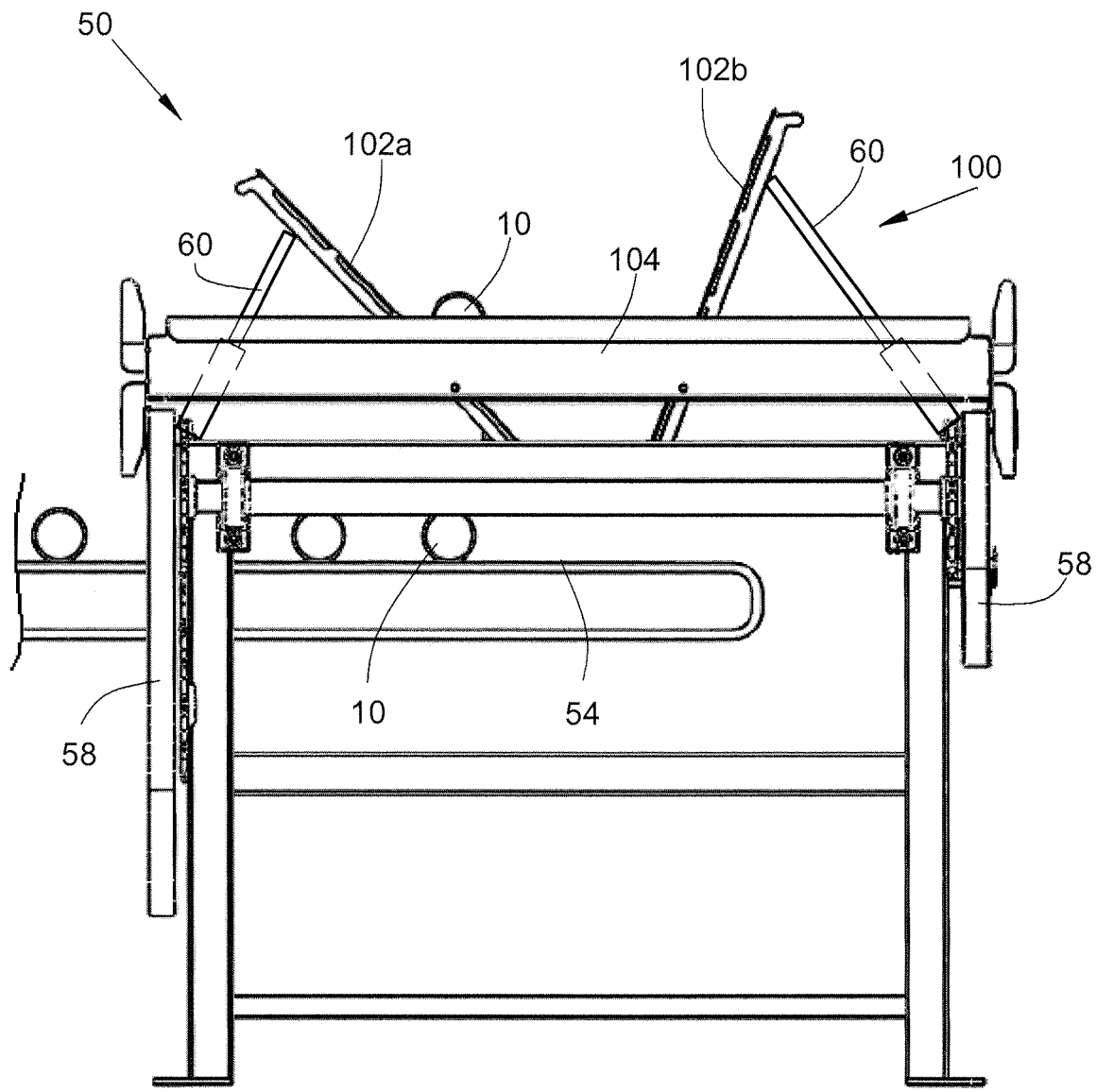

The transport tray 100 has a bottom 102a, 102b and the frame 104 extends around the bottom 102a, 102b over a sufficient height to prevent the food products 10 from rolling and falling from the transport tray 100 in an inopportune manner. The frame 104 forms the chassis of the transport tray 100 and the support zone for resting on the chains 58. The frame 104 and the transport tray 100 are thus intended to move on the struts 52.

The bottom is divided into two panels 102a and 102b which, in the transport position, are arranged so as to be continuous with each other and each have a first edge 112a, 112b that faces the first edge 112b, 112a of the other panel 102b, 102a, and extends along a separation line 106 parallel to the axis 12 of the food products 10.

Figure 3:
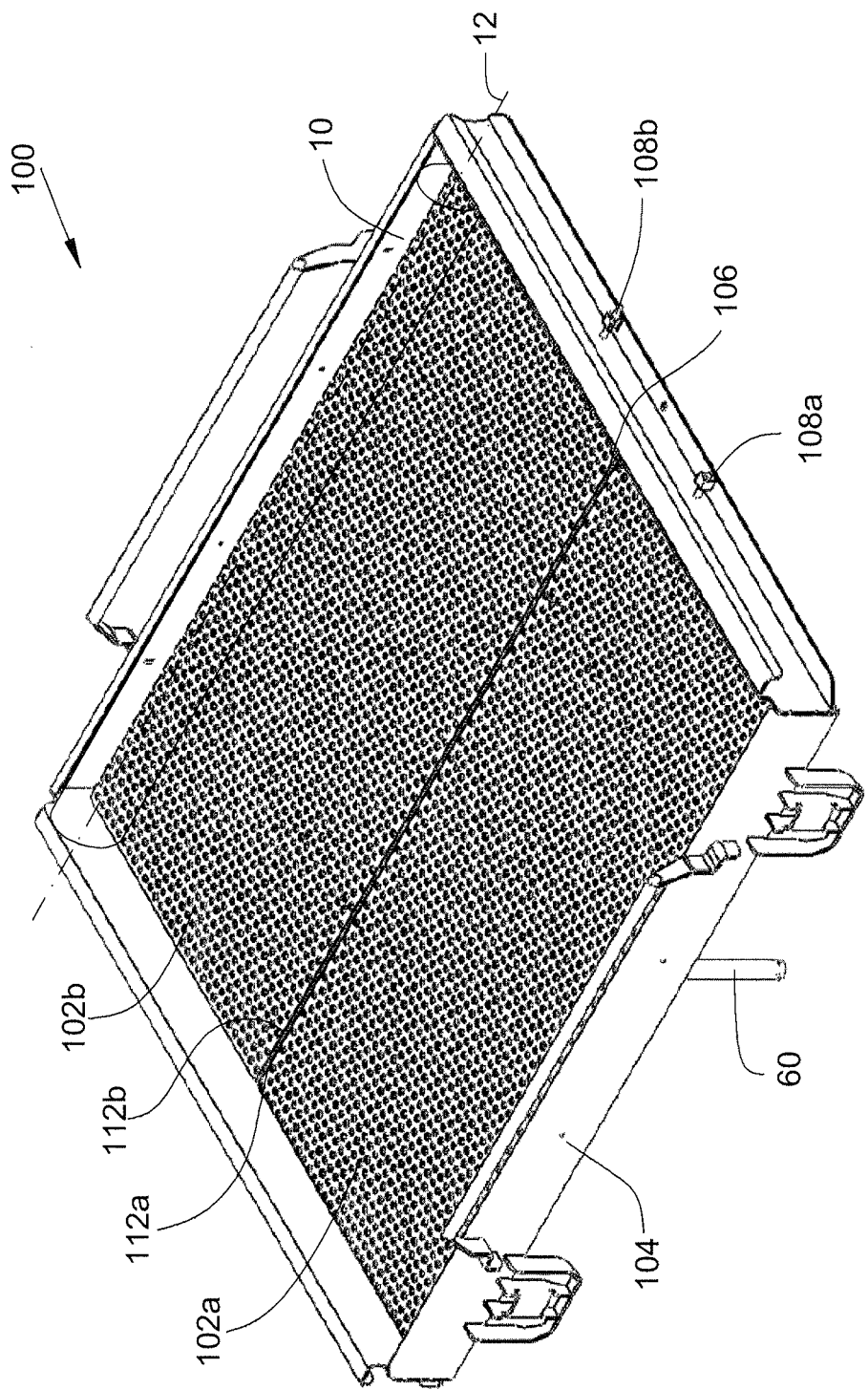
FIG. 3 shows the transport tray in the transport position.
Figure 4:
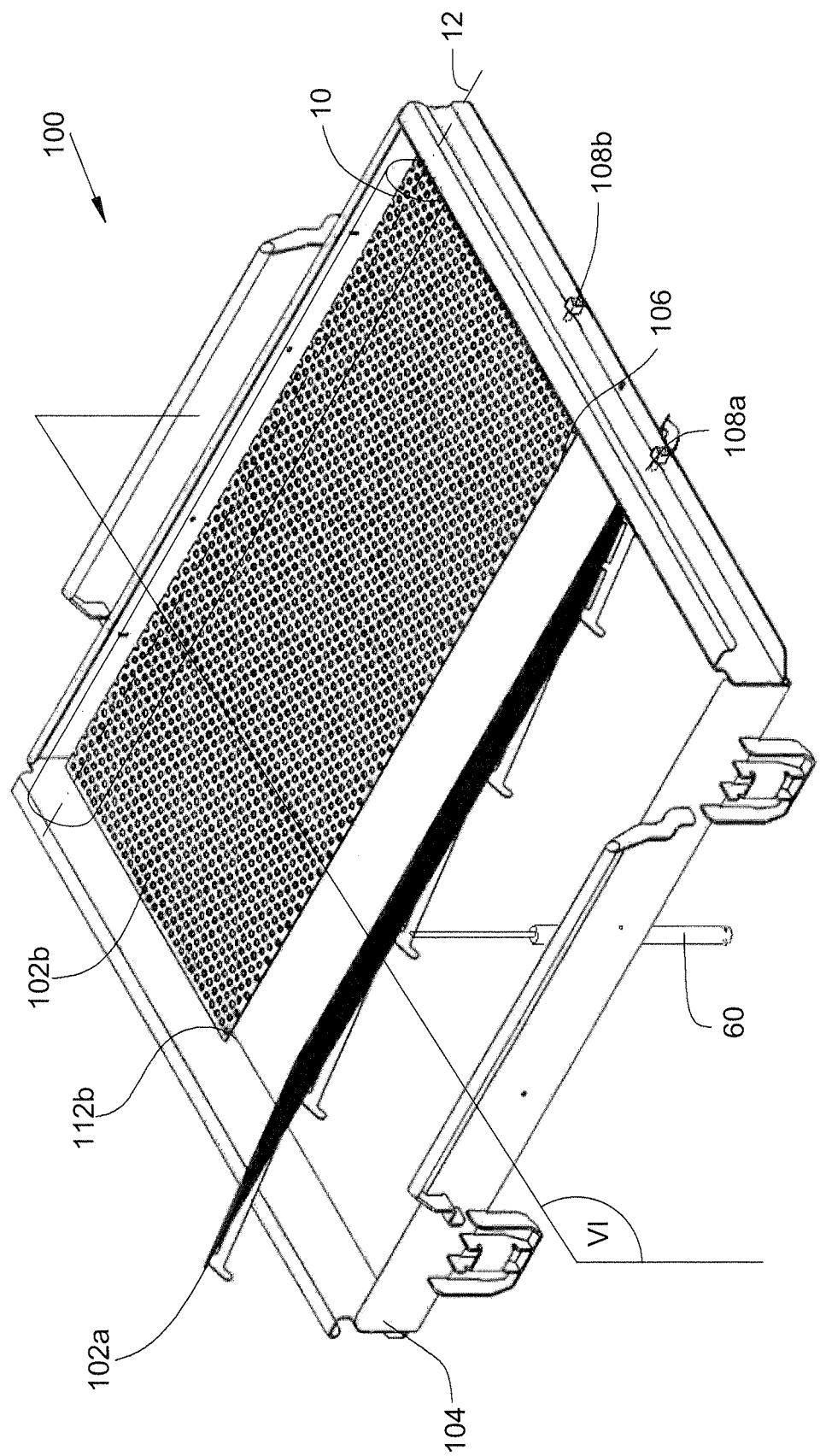
FIG. 4 shows the transport tray 100 in a first unloading position and FIG. 5 shows the transport tray 100 in a second unloading position.
Figure 5:
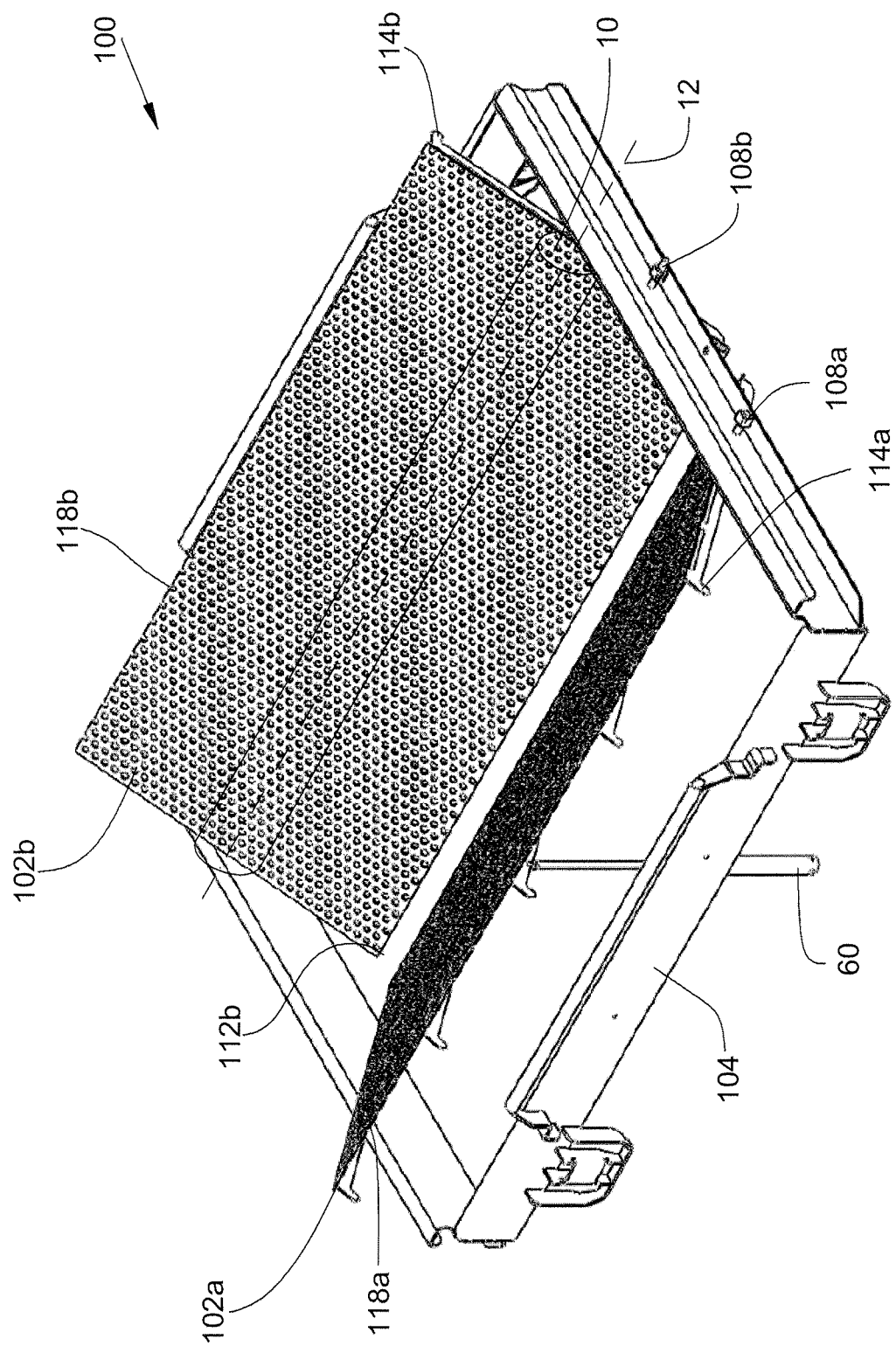

Each panel 102a, 102b is mounted, on the frame 104, so as to be able to move in rotation about a rotation axis 108a, 108b parallel to the axis 12 of the food products 10 between the transport position (FIG. 3) and the unloading position (FIG. 4 and FIG. 5). The rotation axes 108*a* and 108*b* are substantially horizontal and parallel to each other.

In a preferred embodiment, the rotation axis 108*a*, 108*b* is disposed so that the centre of gravity 110*a*, 110*b* of the corresponding panel 102*a*, 102*b* is situated on the other side of said rotation axis 108*a*, 108*b* with respect to its first edge 112*a*, 112*b*, which ensures a return to the transport position when no load is present on the panels 102*a* and 102*b*.

In the transport position, each panel 102*a*, 102*b* is horizontal so that the food products 10 remain on it.

In the unloading position, one or both panels 102*a*, 102*b* are pivoted so that the first edge 112*a*, 112*b* thereof falls and therefore, in the preferred embodiment, its centre of gravity 110*a*, 110*b* rises.

In the transport position, the distance between the first edges 112*a* and 112*b* is less than the diameter of the food products 10 and, in the unloading position, the distance between the first edges 112*a* and 112*b* is greater than the diameter of the food products 10.

Each panel 102*a*, 102*b* is able to move independently of the other panel 102*b*, 102*a*.

In order to keep the panel 102*a*, 102*b* in the transport position and prevent raising of the first edge 112*a*, 112*b* beyond the transport position, the transport tray 100 comprises limitation means 114*a*, 114*b*, 116*a* and 116*b*.

Each panel 102*a*, 102*b* can therefore effect a rotation that tends to lower its first edge 112*a*, 112*b* from the transport position as far the unloading position and a rotation that tends to lift its first edge 112*a*, 112*b* from the unloading position as far as the transport position.

Figure 6:
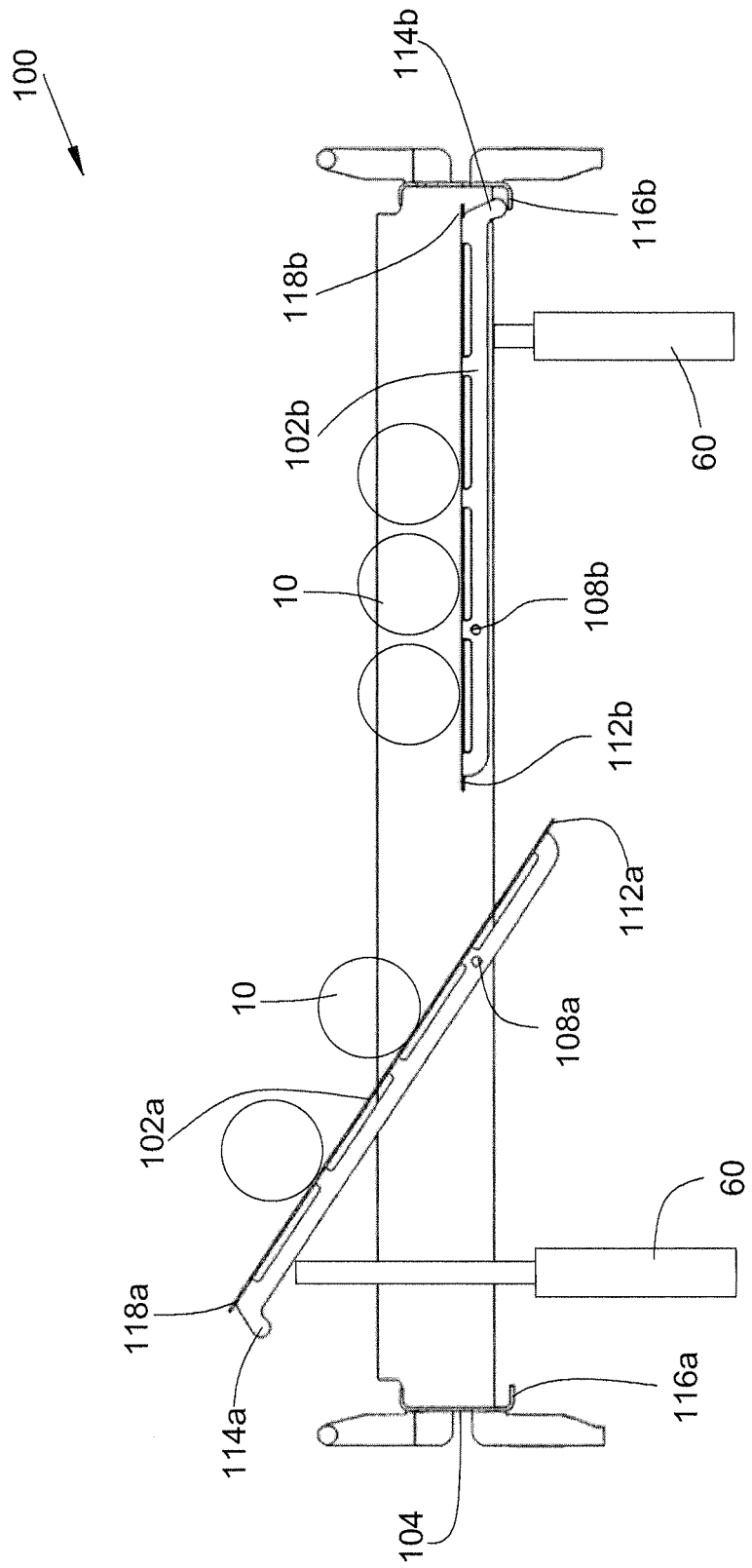

In the embodiment of the invention presented in FIG. 6, which is a cross section of the transport tray 100 of FIG. 4, the limitation means consist of a stop 114*a*, 114*b* that each panel 102*a*, 102*b* has and, for each stop 114*a*, 114*b*, a support 116*a*, 116*b* that the frame 104 has and on which said stop 114*a*, 114*b* comes into abutment in the transport position.

In the embodiment of the invention presented in FIG. 6, the stop 114*a*, 114*b* is disposed along a second edge 118*a*, 118*b* of the panel 102*a*, 102*b*, which extends parallel to the first edge 112*a*, 112*b*, but it is possible to dispose the stop on the edges perpendicular to the first edge 112*a*, 112*b*.

In the same way, according to the position of the stop 114*a*, 114*b* with respect to the rotation axis 108*a*, 108*b*, the support 116*a*, 116*b* will be placed above or below the stop 114*a*, 114*b*.

When the trays 102*a* and 102*b* are loaded they remain in the horizontal position, which prevents discharge of the food products 10.

When one (FIG. 4) or both (FIG. 5) trays 102*a* and 102*b* are placed in the unloading position, the first edges 112*a* and 112*b* fall and separate from each other in order to allow the food products 10 to pass which, by gravity, roll or slide on the corresponding tray 102*a*, 102*b* and fall onto the discharge means 54.

The positioning of the two trays 102*a* and 102*b* makes it possible to move the falling position of the food products towards the centre of the transport tray 100 substantially in the vicinity of the contact line 106.

In order to prevent a food product 10 from falling onto the struts 52, each tray 102*a*, 102*b* is conformed so as to transport at least one food product 10 and preferably more than two. This is because the more food products 10 a tray 102*a*, 102*b* can transport, the more the position of the fall moves away from the strut 52 situated on the side of said tray 102*a*, 102*b*.

Preferentially, the contact line 106 is situated at the middle of the transport tray 100, that is to say the dimensions of the trays 102*a* and 102*b* perpendicular to the contact line 106 are equal.

This is because, in the case of a single rotary tray constituting the bottom, the opening of the bottom that enables the food products to fall takes place as from the first edge that is situated above the strut. The food products then fall onto the strut, which may spoil them.

In order to pivot the trays 102*a* and 102*b*, the manufacturing installation 50 also comprises, for each tray 102*a*, 102*b*, an actuator 60 that is intended to pivot said tray 102*a*, 102*b* from the transport position to the unloading position above the discharge means 54.

In a particular embodiment of the invention each actuator 60 takes the form of a jack that is fixed to the chassis of the manufacturing installation 50 and acts on the panel 102*a*, 102*b* in the vicinity of its second edge 118*a*, 118*b* in order to lift it.

Naturally the present invention is not limited to the examples and embodiments described and depicted but is capable of numerous variants accessible to a person skilled in the art.

In the invention, the discharge means moves perpendicular to the struts, but it is possible to provide for the discharge means to move in parallel.

In the same way, the invention has particularly been described in the case of cylindrically shaped food products but can be used for food products having a different shape as long as this shape enables the food product to slide on the panels constituting the bottom when they are in the unloading position. The diameter of the food product is then the dimension in the plane perpendicular to the direction of the first edges.

In the invention presented here, the transport tray may for example be a mould that is used during the preparation of the food product such as for example during the water or steam cooking phase, during a phase of passing through a gaseous element, of the smoking type.

It is also possible to implement this invention in the context of a preparation of whole pieces of ham.

Each transport tray may or may not comprise a crossbar and leg assembly, which may then be parallel to or perpendicular to the longitudinal direction defined by the direction of the first edges.

The invention claimed is:

1. A transport tray (100) intended to be used in an installation (50) for manufacturing food products (10), said manufacturing installation (50) comprising actuators (60), the transport tray (100) being characterised in that it comprises:
    a chassis (104),
    a bottom (102*a*, 102*b*) around which said chassis (104) extends, said bottom consisting of two panels (102*a*, 102*b*) mounted on the chassis (104), each having a first edge (112*a*, 112*b*) parallel to and facing the first edge (112*a*, 112*b*) of the other panel (102*a*, 102*b*), each panel (102*a*, 102*b*) being able to move in rotation about a rotation axis (108*a*, 108*b*) parallel to said first edges (112*a*, 112*b*) between a transport position (FIG. 3) in which the distance between the first edges (112*a*, 112*b*) is less than a dimension of the food products (10) in a plane perpendicular to the direction of the first edges and an unloading position (FIG. 4, FIG. 5) in which at least one of the first edges (112*a*, 112*b*) is lowered so that the distance between the first edges (112*a*, 112*b*) is greater than said dimension of the food products (10), each panel (102*a*, 102*b*) being engaged and movable by one of said actuators (60) to move it from the transport position to the unloading position, the centre of gravity (110a, 110b) of each panel being disposed on another side of said rotation axis (108a, 108b) with respect to the first edge (112a, 112b) of said panel (102a, 102b) to facilitate a return of the panels to the transport position, and limitation means (114a, 114b, 116a, 116b) intended to prevent lifting of the first edge (112a, 112b) of each panel (102a, 102b) beyond the transport position, wherein the limitation means for each panel (102a, 102b) comprises a stop (114a, 114b) formed on or fixedly secured to the panel (102a, 102b), said stop (114a, 114b) being positioned to engage a support (116a, 116b) on the chassis (104) when the panel (102a, 102b) is moved to the transport position.

2. The transport tray (100) of claim 1, wherein for each panel (102a, 102b), the stop (114a, 114b) is disposed along a second edge (118a, 118b) of said panel (102a, 102b) that extends parallel to the first edge (112a, 112b).

3. An installation (50) for manufacturing food products (10), characterised in that it comprises:
    a drive system (56),
    a discharge means (54),
    at least one transport tray (100) comprising:
    a chassis (104) moved by said drive system (56),
    a bottom (102a, 102b) around which said chassis (104) extends, said bottom consisting of two panels (102a, 102b) mounted on the chassis (104), each having a first edge (112a, 112b) parallel to and facing the first edge (112a, 112b) of the other panel (102a, 102b), each panel (102a, 102b) being able to move in rotation about a rotation axis (108a, 108b) parallel to said first edges (112a, 112b) between a transport position (FIG. 3) in which the distance between the first edges (112a, 112b) is less than a dimension of the food products (10) in a plane perpendicular to the direction of the first edges and an unloading position (FIG. 4, FIG. 5) in which at least one of the first edges (112a, 112b) is lowered so that the distance between the first edges (112a, 112b) is greater than said dimension of the food products (10), each panel (102a, 102b) being engaged and movable by an, actuator (60) to move the panel (102a, 102b) from the transport position to the unloading position above the discharge means (54), the centre of gravity (110a, 110b) of each panel being disposed on another side of said rotation axis (108a, 108b) with respect to the first edge (112a, 112b) of said panel (102a, 102b) to facilitate a return of the panel to the transport position, and limitation means (114a, 114b, 116a, 116b) intended to prevent lifting of the first edge (112a, 112b) of each panel (102a, 102b) beyond the transport position, wherein the limitation means for each panel (102a, 102b) comprises a stop (114a, 114b) formed on or fixedly secured to the panel (102a, 102b), said stop (114a, 114b) being positioned to engage a support (116a, 116b) on the chassis (104) when the panel (102a, 102b) is moved to the transport position.

4. The installation (50) of claim 3, wherein the discharge means (54) consists of a conveyor, of the belt conveyor type.

5. The installation (50) of claim 3, wherein for each panel (102a, 102b), the stop (114a, 114b) is disposed along a second edge (118a, 118b) of said panel (102a, 102b) that extends parallel to the first edge (112a, 112b).

* * * * *